Patented June 16, 1942

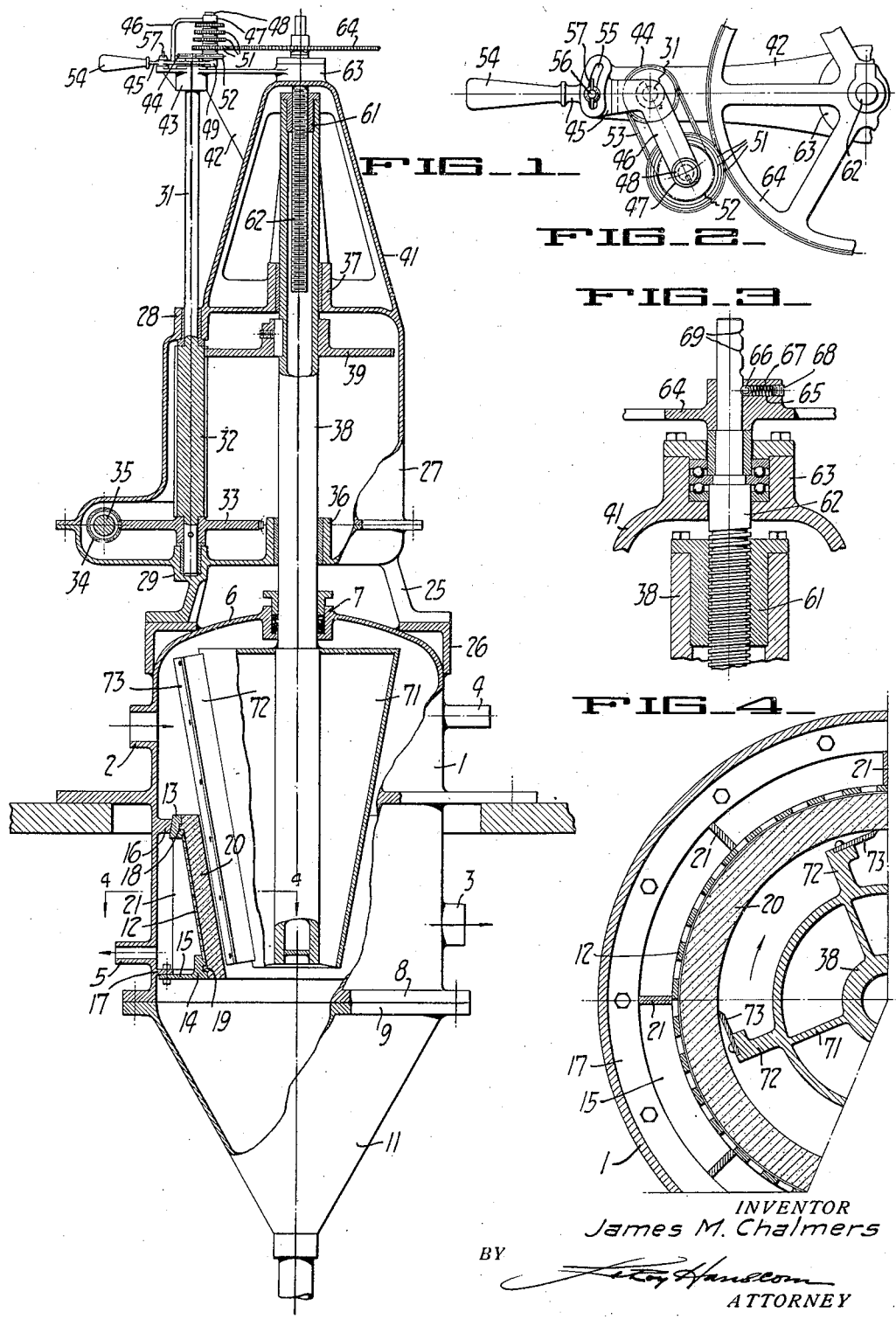

2,286,400

UNITED STATES PATENT OFFICE 2,286,400

FILTER

James M. Chalmers, East Orange, N. J., assignor to Oliver United Filters Incorporated, Oakland, Calif., a corporation of Nevada Application October 21, 1939, Serial No. 300,596

2 Claims. (Cl. 210—186)

This invention relates to filters for separating solids from liquids and particularly to that type of filter wherein the filter medium per se consists of a layer or precoat of comminuted material such as diatomaceous earth and wherein the outer surface of such precoat is continuously or periodically shaved off so as continuously to present a fresh filtering surface to the material being filtered.

In general, the object of the invention is the provision of a filter having a conical precoated filtering surface and a conical cutter coaxially disposed with said surface and arranged for longitudinal axial movement so that the blades of the cutter may be advanced toward or retracted from the conical filtering surface.

Another object of the invention is the provision of a new and novel mechanism for effecting relative motion between the cutter of a precoat filter and the precoat filtering surface.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is a vertical mid-section of a precoat filter embodying the objects of my invention.

Figure 2 is a partial top plan view of the filter shown in Figure 1.

Figure 3 is an enlarged vertical section of the upper end of the mechanism shown in Figure 1.

Figure 4 is a section taken on the line 4—4 of Figure 1.

The filter shown in these figures comprises a cylindrical casing 1 provided with a feed inlet 2, a filtrate outlet 3, a relief outlet 4, and a drain outlet 5. The upper end of the cylindrical casing 1 is closed by a dome-shaped top 6 formed with a stuffing box 7, and the lower end of the casing 1 terminates in a flange 8 to which is bolted the flange 9 of a conical sump 11. Disposed within the casing 1 is a conical perforated basket 12 secured at its upper end to a tapered ring 13 and at its lower end to a ring 14 provided with an outwardly extending annular flange 15. The tapered outer surface of the ring 13 seats against a tapered flange 16 welded to the inner surface of the casing 1, and the annular flange 15 seats against and is bolted to an inwardly extending annular flange 17 formed integral with the casing 1. The inner surfaces of the rings 13 and 14 are formed with annular grooves 18 and 19 which aid in holding a conical layer or precoat 20 of filtering material such as diatomaceous earth to the perforated basket 12. The rings 13 and 14 are held in fixed position by vertical circumferentially spaced ribs 21. By having available several perforated baskets, it is possible to readily replace them by simply removing the conical sump 11 and unbolting the lower annular flange 15 of the basket from the annular flange 17 of the casing 1.

Carried on brackets 25 supported on the circular angle 26 welded to the dome 6 of the casing 1 is a split gear housing 27. Journaled in spaced bearings 28 and 29 formed in the gear housing 27 is a shaft 31, and keyed to this shaft within the housing are a pinion 32 and a worm wheel 33. The worm wheel 33 is adapted to be driven by a worm 34 formed on a shaft 35 extending through the gear casing 27 and arranged to be driven by any suitable source of power.

Extending through the stuffing box 7 and journaled in bearings 36 and 37 formed in the gear housing 27 is a hollow shaft 38. Keyed to this shaft within the gear housing is a gear wheel 39 arranged to mesh with and be driven by the pinion 32.

Extending upwardly from the gear casing 27 is a frame 41 formed with a laterally extending bracket 42. The bracket 42 carries a bearing 43 through which the upper end of the shaft 31 extends, and keyed to the upper end of the shaft 31 is a sprocket 44. Journaled on the shaft 31 intermediate the sprocket 44 and the bearing 43 is a lever 45 formed with an overhanging bracket 46. Suspended from a bearing 47 formed at the end of the bracket 46 is a pin 48, the lower end of which is journaled in a bearing 49 formed at the inner end of the lever 45. Keyed to the pin 48 are a plurality of gear wheels 51 of varying diameters, and a driven sprocket wheel 52 adapted to be driven by the sprocket wheel 44 through a chain 53. The lever 45 terminates at its left end in a handle 54, and is formed with an arcuate slot 55 through which extends a screw 56 carried by the bracket 42. The lever 45 may therefore be secured within limits in any desired position with relation to the bracket 42 by a wing nut 57 threaded to the screw 56.

Bolted to the upper end of the hollow shaft 38 is a sleeve 61 having threaded engagement with a shaft 62. The shaft 62 is journaled within a bearing 63 formed in the upper end of the frame 41 and carries at its upper end a ring gear 64 arranged to be placed in mesh with any one of the gear wheels 51 keyed to the pin 48. To accomplish this purpose the hub of the gear 64 is provided with a recess 65 for the accommodation of a ball 66, a spring 67, and a nut 68, and the upper end of the shaft 62 is formed with a plurality of spaced ball-receiving recesses 69. The spacing of these recesses 69 is made to conform with the spacing of the gears 51 so that the gear 64 may be keyed to the shaft 62 in such a way as to mesh with any one of the desired gears 51. To change the gear ratio between the shafts 31 and 62, the lever 45 is first rotated so as to bring the gears 51 free and clear of the gear 64, the gear 64 is then adjusted longitudinally on the shaft 62 so as to mesh with the desired gear 51, and this having been done the selected gear 51 is brought into mesh with the gear 64 by rotating the lever 45 and locking it in place.

Secured to the lower end of the hollow shaft 38 within the casing 1 is a spider 71 formed with tapered radial flanges 72. Secured to the radial flanges 72 are cutters or blades 73 arranged to describe during their rotation a conical surface in conformity with the conical surface of the precoat 20 carried by the perforated basket 12.

The rate of rotation of the hollow shaft 38 and therefore of the cutters 73 depends upon the gear ratio between the pinion 32 and the gear 39. The movement of the shaft 38 along its own axis, however, depends upon the relative rotation between the hollow shaft 38 and the shaft 62, and in this connection it should be noted that both of these members are positively driven. The movement of the shaft 38 along its own axis may therefore be varied by selectively engaging the ring gear 64 with any one of the gears 51 without in any way changing the rate of rotation of the cutters 73.

The operation of the device above described is as follows:

The basket 12 with its layer 20 of precoat is bolted in place as shown in Figure 1 and the casing maintained filled through the inlet 2 with the liquor to be filtered, at any desired pressure. As filtration progresses due to the differential filtering pressure so imposed between the two sides of the precoat 20, filtrate passes through the precoat into the chamber defined by the casing 1 and the basket 12 and is discharged through the filtrate outlet 3. Simultaneously a film or layer of solids is deposited on the outer or exposed surface of the precoat. The rotation of the shaft 31 results in the rotation of the blades 73 and in the downward movement of the hollow shaft 38 so that the cutters 73 continuously shave off not only the cake of solids deposited on the precoat 20 but also the outer surface of the precoat, so as continuously to present a fresh filtering surface to the liquor being filtered.

If desired, the layer 20 of precoat material may be deposited on the basket 12 by circulating through the filter a liquid in which is suspended the material from which the precoat is made. However it is believed that by having available a number of baskets on which a precoat has been previously deposited, a considerable saving of time will be effected, for the time required to change the baskets is less than the time required for building up a layer of precoat by an independent precoating operation.

Obviously a filter as above described may be operated either as a vacuum filter or as a pressure filter, the only requirement being that a differential pressure be imposed between the two sides of the filter medium.

I claim:

1. A filter comprising: a filter cell provided with a conical filtering surface formed of a substantial layer of comminuted material and designed to be subjected to a differential filtering pressure; a longitudinally movable rotary shaft coaxial with said filtering surface and provided with a cutter arranged to rotate therewith and describe a conical surface of revolution over said filtering surface; a longitudinally immovable shaft coaxial and having threaded engagement with said longitudinally movable shaft; a drive shaft adjacent and parallel to said longitudinally movable shaft; means for driving said longitudinally movable shaft so as to advance said cutter into said filtering surface from said drive shaft; a plurality of gears of varying sizes driven by said drive shaft; a gear carried by said longitudinally immovable shaft; and means for selectively meshing said gear with any one of said plurality of gears.

2. A pressure precoat filter comprising: a totally enclosed liquid-tight casing; a filter cell having a conical filtering surface disposed within said casing; a longitudinally movable shaft extending through the upper portion of said casing and rotatably mounted on the axis of said filtering surface; a cutter carried by said shaft and arranged to rotate therewith and describe a conical surface of revolution over said filtering surface; a rotatable, longitudinally immovable shaft having threaded coaxial engagement with said longitudinally movable shaft; and means for effecting relative rotation between said shafts.

JAMES M. CHALMERS.